H. A. MacCLYMENT.
LUBRICANT HOLDER.
APPLICATION FILED JUNE 28, 1906.
937,682.
Patented Oct. 19, 1909.
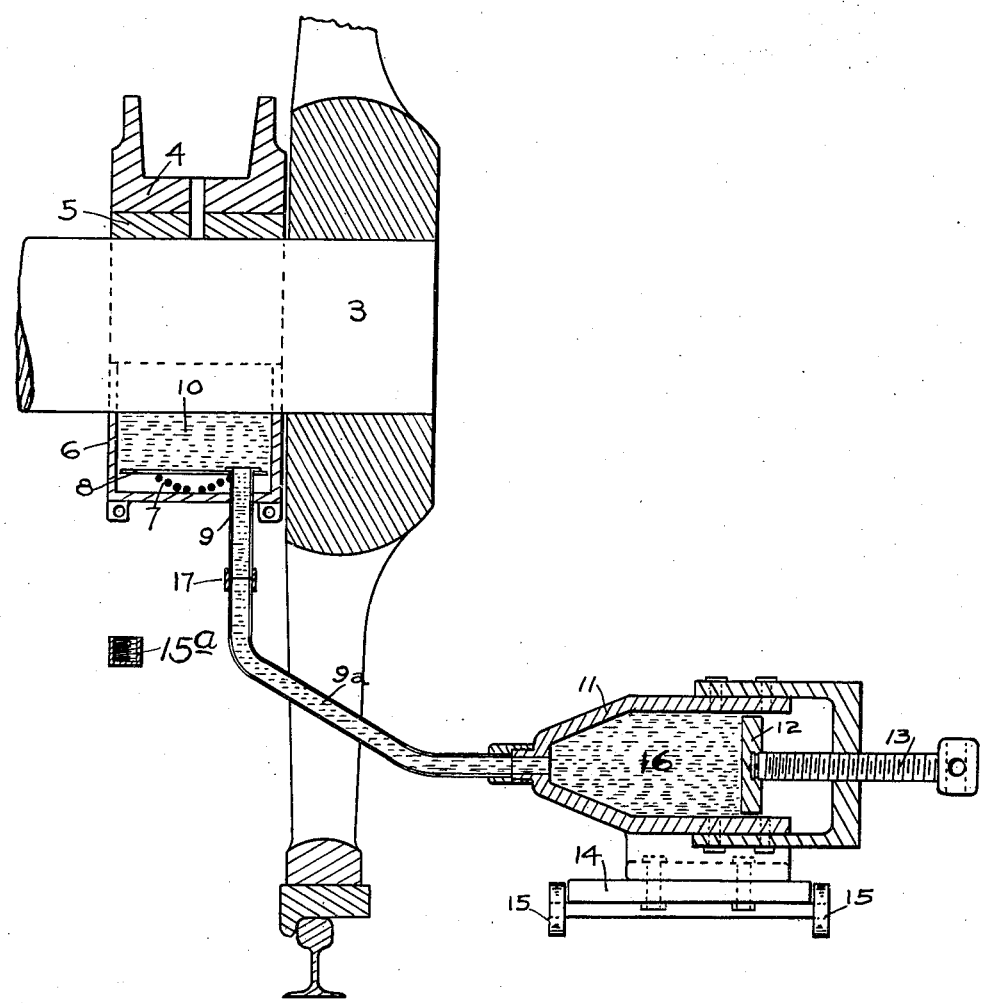
WITNESSES:
L.W. Patch
A. U. Hammond.
INVENTOR.
Harry A. MacClyment
BY
his ATTORNEYS.

UNITED STATES PATENT OFFICE.

HARRY A. MacCLYMENT, OF BURLINGTON, IOWA.

LUBRICANT-HOLDER.

937,682.

Specification of Letters Patent. Patented Oct. 19, 1909.

Application filed June 28, 1906. Serial No. 323,949.

*To all whom it may concern:*

Be it known that I, HARRY A. MACCLYMENT, a citizen of the United States, residing at Burlington, in the county of Des Moines and State of Iowa, have invented certain new and useful Improvements in Lubricant-Holders, of which the following is a specification.

My invention relates to lubricant holders, and more particularly to that class of devices in which heavy lubricating material which must be forced into the holder by means of a refilling device capable of exerting a considerable degree of pressure, is used.

The object of the invention is to provide a holder which may be quickly refilled and one in which the lubricant will be held at all times in contact with the axle, and to this end the invention consists in providing a journal box of ordinary construction with a chamber containing a movable plate held in position by a supporting spring, said plate having an opening therein which is connected with a supply pipe passing through the casing.

The drawing shows a view in section of my improved lubricant holder applied to the axle of a railway car, a replenishing device and a portion of the car wheel and the rail also being shown.

Referring to the drawings in detail, 3 represents an axle of a railway car provided with a journal box 4 having a bearing 5 and provided with a cellar or chamber 6 for the reception of the lubricant. Within the cellar is a spring 7 bearing against the plate 8, the latter serving to hold the mass of lubricating material, which is usually of the consistency of bar soap, against the axle. This plate 8 is provided with an opening having connection with a supply pipe 9 which enters the casing through an aperture provided for the purpose, and which is sufficiently large to permit the pipe to move therein when the plate is forced toward or away from the axle. A pipe section 9ª is connected with the pipe 9 by the coupling 17 and the cellar cavity 10 with the chamber 11 of the refilling device, and a plate or follower 12 has connected thereto a screw 13 by means of which the lubricant 16 is forced into the lubricant holder. The refilling device may be mounted on a truck 14 provided with wheels 15. A cap 15ª serves to close the pipe 9 when the refilling device is detached.

Having thus fully described my invention, what I claim as new is:—

1. In a lubricant cellar, a casing, a spring actuated follower therefor, said follower having a lubricant introducing opening, and means for closing said opening.

2. In a lubricant cellar, a casing, a spring actuated follower acting directly on the lubricant, said follower having a lubricant introducing opening, and means for closing said opening.

3. The combination of a journal box having a chamber therein for holding a lubricant, a movable plate having an aperture therein, a pipe entering the journal box and passing through the aperture in said plate, and a spring bearing against the plate for forcing the lubricant into contact with the axle.

4. The combination of a journal box having a chamber therein for holding a lubricant, a movable plate having an aperture therein, located within the chamber, a pipe entering the journal box and passing through the aperture in the plate, and means for holding the plate in position and forcing it against the lubricant.

In testimony whereof I have signed my name to this specification in the presence of two subscribing witnesses.

HARRY A. MacCLYMENT.

Witnesses:
T. W. KRIECHBAUM,
C. J. ARTZ.